No. 827,536. PATENTED JULY 31, 1906.
G. J. KINDEL.
AIR CLEANING APPARATUS.
APPLICATION FILED SEPT. 26, 1905.
2 SHEETS—SHEET 2.
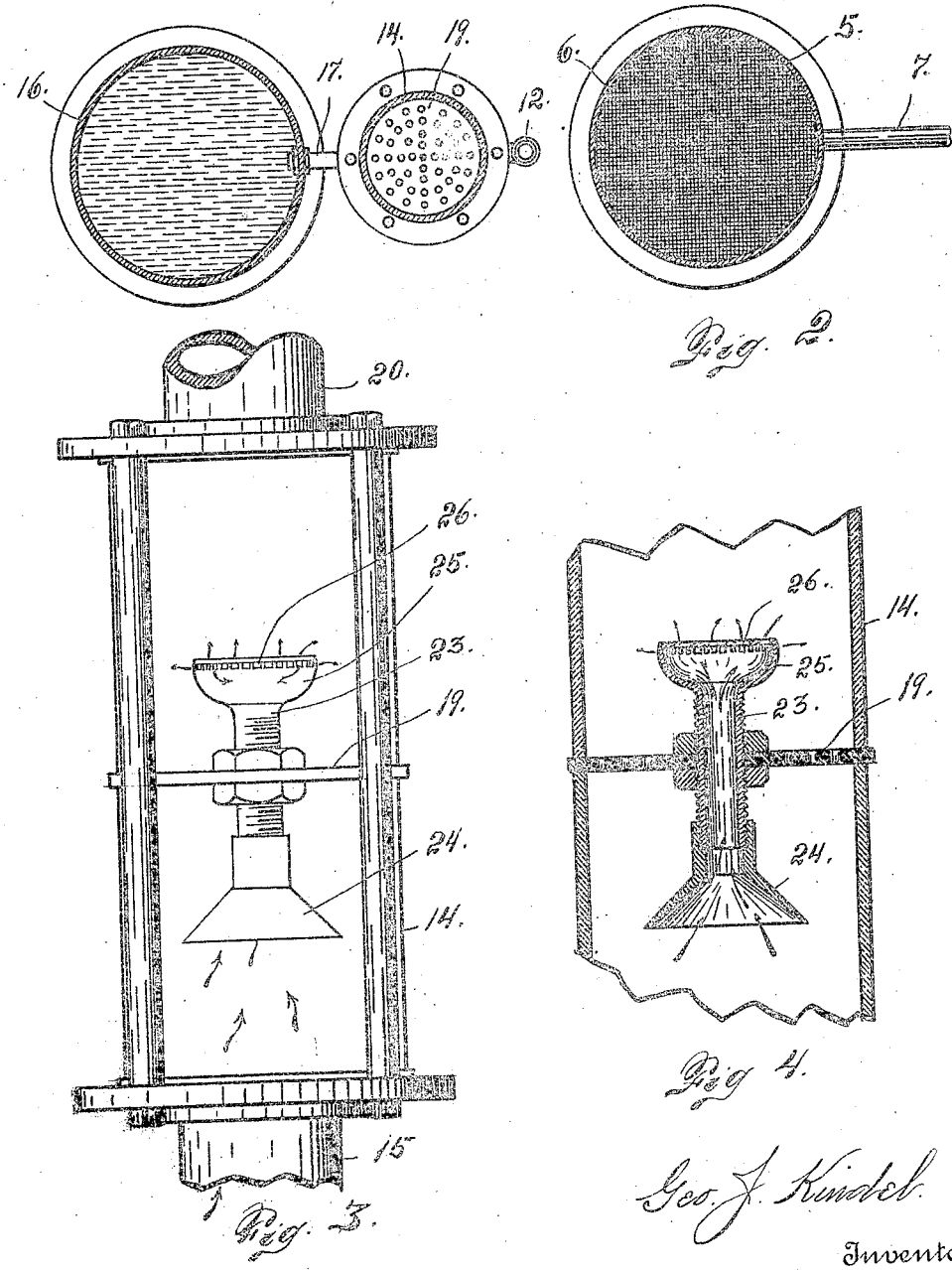

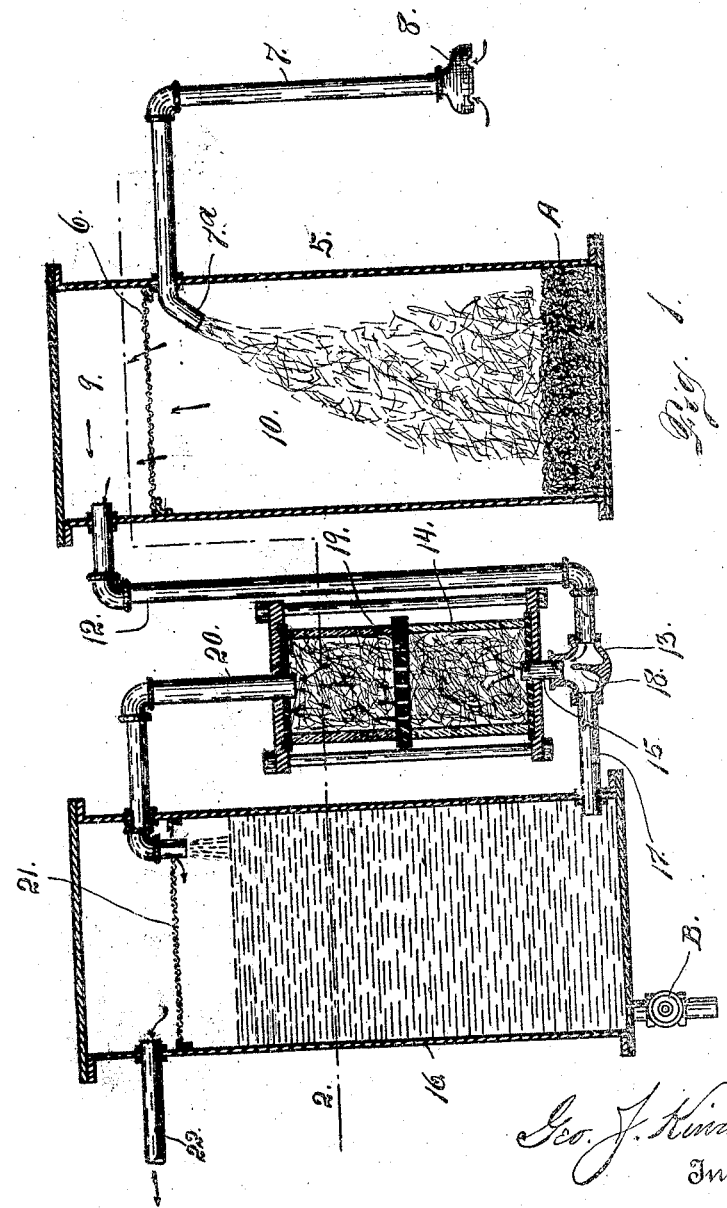

UNITED STATES PATENT OFFICE.

GEORGE J. KINDEL, OF DENVER, COLORADO.

AIR-CLEANING APPARATUS.

No. 827,528. Specification of Letters Patent. Patented July 31, 1906.

Application filed September 26, 1905. Serial No. 280,121.

*To all whom it may concern:*

Be it known that I, GEORGE J. KINDEL, a citizen of the United States, residing in the city and county of Denver and State of Colorado, have invented certain new and useful Improvements in Air-Cleaning Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in apparatus for separating the dust from air, being more especially intended for use in connection with the removing of dust from carpets or other surfaces or objects in buildings. In cleaning apparatus of this class it becomes of the utmost importance to remove the dust from the air before allowing the latter to escape, since under ordinary circumstances it becomes impracticable to carry the dust-laden air to a sufficient distance from the buildings where the cleaning is going on to prevent the annoyance resulting from the escape of the dust with the air. By virtue of my improvements the dust is removed or separated from the air in an efficient and economical manner, thus making it practicable to deliver the cleansed air to the air-pump and return it again to the compressed-air tank from which the supply of compressed air is used in house-cleaning systems employing both compressed air and suction. Where this system is employed, there is no escape of the air, since it is used over and over again, being thoroughly cleansed through the instrumentality of my improvement.

My improved construction, as illustrated in the drawings, consists of a dust-receptacle, a water-tank, and an auxiliary air-cleansing receptacle connected both with the water-tank and with the dust-receptacle. This auxiliary receptacle is connected with the water-tank both at the top and bottom, the bottom connection being made to allow the water to enter the auxiliary receptacle from the tank, while the top connection permits the escape of the air into the upper part of the water-containing tank. The pure air enters the last-named tank below a fine screen adapted to retard the splashing of the water, due to the agitation of the latter. The top of this water-tank above the screen is connected with the pump or suction-inducing apparatus. The air, laden with dust, is passed originally into the dust-receptacle below a screen. In this dust-receptacle the heavier dirt is deposited; but the finer portion thereof passes upwardly through a screen-diaphragm and thence through a conduit leading downwardly and finally communicating with the bottom of the air-cleansing receptacle. This communication with the last-named receptacle is common to both the dust-chamber and water-tank.

Having briefly outlined my improved construction, I will proceed to describe the same in detail, reference being made to the accompanying drawings, in which is illustrated an embodiment thereof.

In the drawings, Figure 1 is a section taken through the water-tank, the dust-chamber, and the air-cleansing receptacle, the parts being shown in operative relation. Fig. 2 is a section taken on the line 2 2 of Fig. 1. Fig. 3 is an elevation of the air-cleansing receptacle, illustrating a modified form of construction. Fig. 4 is a fragmentary sectional view of the same.

The same reference characters indicate the same parts in all the views.

Let the numeral 5 designate a dust-chamber having a screen-diaphragm 6 located in its upper portion. A conduit 7 is connected with a nozzle 8 at its lower extremity and at its upper extremity with a dust-chamber below the screen 6. This nozzle 8 is supposed to be in contact with the surface to be cleaned or the location from which the dust is obtained, the same being carried to the chamber 5 through the instrumentality of suction. The chamber 5 is divided by the screen-diaphragm 6 into upper and lower compartments 9 and 10, the latter compartment including by far the greater portion of the chamber. Connected with the compartment 9 is a conduit 12, which leads downwardly and enters a T 13, the latter being connected with the bottom of the air-cleansing receptacle 14 by a short conduit 15. The water-containing tank 16 is also connected with the T 13 by means of a pipe 17, leading from the bottom of the tank to the T. This T is provided with a partition 18, located between the extremities of the pipe 15 and the conduit 12.

The receptacle 14 is provided with a perforated diaphragm 19, whose function is to separate and break up the air, whereby the separation of the dust therefrom is greatly facilitated. The upper part of the receptacle 14 is provided with an outlet-conduit 20, whose upper extremity communicates with the top of the water-tank 16 above the water-level and below a screen-diaphragm 21. A suction-pipe 22 is connected with the upper part of the water-tank above the diaphragm 21. This pipe 22 communicates with an air-pump, (not shown,) but through whose instrumentality the suction is obtained which acts on the conduit 7 and whereby the air is drawn through the entire apparatus.

From the foregoing description the use and operation of this form of my improved device will be readily understood. The dust-laden air entering the chamber 5 below the diaphragm 6 is freed from its heaviest dust particles, which drop downwardly into the tank, the dust deposit being designated A. Attention is called to the fact that the conduit 7 is directed downwardly, as shown at 7ª, where it enters the chamber 5 to facilitate this result. The finer dust, however, passes up through the diaphragm 6 with the air and is carried downwardly through the conduit 12 and introduced into the bottom of the air-cleansing receptacle 14. This receptacle contains water by virtue of its connection with the water-tank 16, and when the apparatus is in operation the introduction of air through this receptacle greatly agitates the water and facilitates the air-cleansing operation. This cleansing operation is further assisted by virtue of the perforated diaphragm 19, through which the air and water must pass. In the form of construction shown in Figs. 3 and 4 a nozzle 23 is connected with the central part of the diaphragm 19. This nozzle has a funnel-shaped lower extremity 24 and an enlarged upper extremity 25, provided at the top with a perforated diaphragm 26. This or any other suitable device may be located within the air-cleansing receptacle for the purpose of breaking up the air, whereby it is caused to release the particles of dust. The air after passing through the receptacle 14 passes with the water out through the conduit 20 and enters the upper extremity of the water-tank 16 below the screen-diaphragm 21 and finally escapes through the suction-pipe.

Attention is called to the fact that during the operation of the device there is a circulation of water from the tank 16 up through the air-cleansing receptacle 14, up through the conduit 20, and back into the top of the tank 16. This circulation is of such a nature as to completely remove all impurities from the air. The air enters the tank 16 at the top with the water, but passes upwardly through the screen 21 and out through the suction-pipe 22, as heretofore explained. The screen-diaphragm 6 is readily removable for the purpose of removing the dust from the chamber 5. The tank 16 is provided with a valve-controlled outlet B for the purpose of removing the water therefrom after it has become sufficiently foul to make it impracticable to use it longer for air-cleansing purposes.

The receptacle 14 is preferably composed of glass or transparent material in order that the action of the water when agitated by the air may be observed by the person in charge of the apparatus.

Having thus described my invention, what I claim is—

1. In means for separating dust from air, the combination of a dust-chamber, a water-tank and an air-cleansing receptacle, the water-tank being connected with the said receptacle at the bottom to allow the water to enter the receptacle, the top of the latter being in communication with the said tank above the water-level, the top of the dust-chamber being in communication with the bottom of the said receptacle, the dust-chamber having an inlet for the dust-laden air, and suction-producing means in communication with the water-tank above the water-level, the suction acting to cause the air to travel through the entire apparatus.

2. In air-cleansing apparatus, the combination of a dust-chamber having a screen-diaphragm in its upper portion, a dust-conduit communicating with the chamber below the said diaphragm, an air-cleansing receptacle, a conduit connecting the dust-chamber above the screen-diaphragm with the bottom of the air-cleansing receptacle, a water-tank connected with the air-cleansing receptacle at the top and bottom, the bottom connection allowing the water to enter the receptacle while the top connection enters the tank above the water-level, and suction-inducing means communicating with the tank above the water-level for the purpose set forth.

3. In air-cleansing apparatus, the combination of a dust-chamber having a screen-diaphragm in its upper portion, a conduit for introducing the dust-laden air to the said chamber below the screen-diaphragm, a transparent air-cleansing receptacle, a conduit connecting the dust-chamber above the diaphragm with the bottom of the said receptacle, a water-containing chamber, a conduit connecting the lower part of the latter with the bottom of the said receptacle, a screen-diaphragm located in the upper part of the tank above the water, a conduit leading from the top of the said receptacle to the water-tank below the screen-diaphragm, and suction-inducing means connected with the water-tank above the screen-diaphragm, the said receptacle being provided with a perforated diaphragm for the purpose set forth.

In testimony whereof I affix my signature in presence of two witnesses.

GEORGE J. KINDEL

Witnesses:
 CLARE KENYON,
 DENA NELSON.